United States Patent [19]
Suizu

[11] 3,799,377
[45] Mar. 26, 1974

[54] STACKING CRANE
[75] Inventor: Dairi Suizu, Sajima-gun, Japan
[73] Assignee: Okura Yusoki Kabushiki Kaisha, Kakogawa City, Hyogo Prefecture, Japan
[22] Filed: May 18, 1973
[21] Appl. No.: 361,446

Related U.S. Application Data
[63] Continuation of Ser. No. 133,621, April 13, 1971, abandoned.

[52] U.S. Cl. ................. 214/89, 214/41, 214/674
[51] Int. Cl. ............................................. B66f 9/20
[58] Field of Search ...... 214/38 BA, 38 CA, 16.4 A, 214/89, 670, 671, 672, 673, 674, 700, 730, 731, 750; 212/21, 128

[56] References Cited
UNITED STATES PATENTS

| | | |
|---|---|---|
| 3,175,721 | 3/1965 | Smith ............................... 214/700 |
| 2,553,378 | 3/1951 | Miller ............................... 212/21 |
| 3,387,731 | 6/1968 | Gibson et al ........................ 214/731 |
| 3,467,264 | 9/1969 | Armington et al .................. 214/730 |
| 2,702,678 | 2/1955 | Flock, Jr ............................ 244/137 |

Primary Examiner—Robert J. Spar
Assistant Examiner—Lawrence J. Oresky
Attorney, Agent, or Firm—Stevens, Davis, Miller & Mosher

[57] ABSTRACT

A loading apparatus comprising a fixed frame, a forwardly and backwardly moving frame mounted on said frame for forward and backward movements in reciprocating motion, an upwardly and downwardly moving frame mounted on said forwardly and backwardly moving frame for upward and downward movements in reciprocating motion, and a plurality of forks provided on said upwardly and downwardly moving frame for operation as said frames are actuated.

2 Claims, 4 Drawing Figures

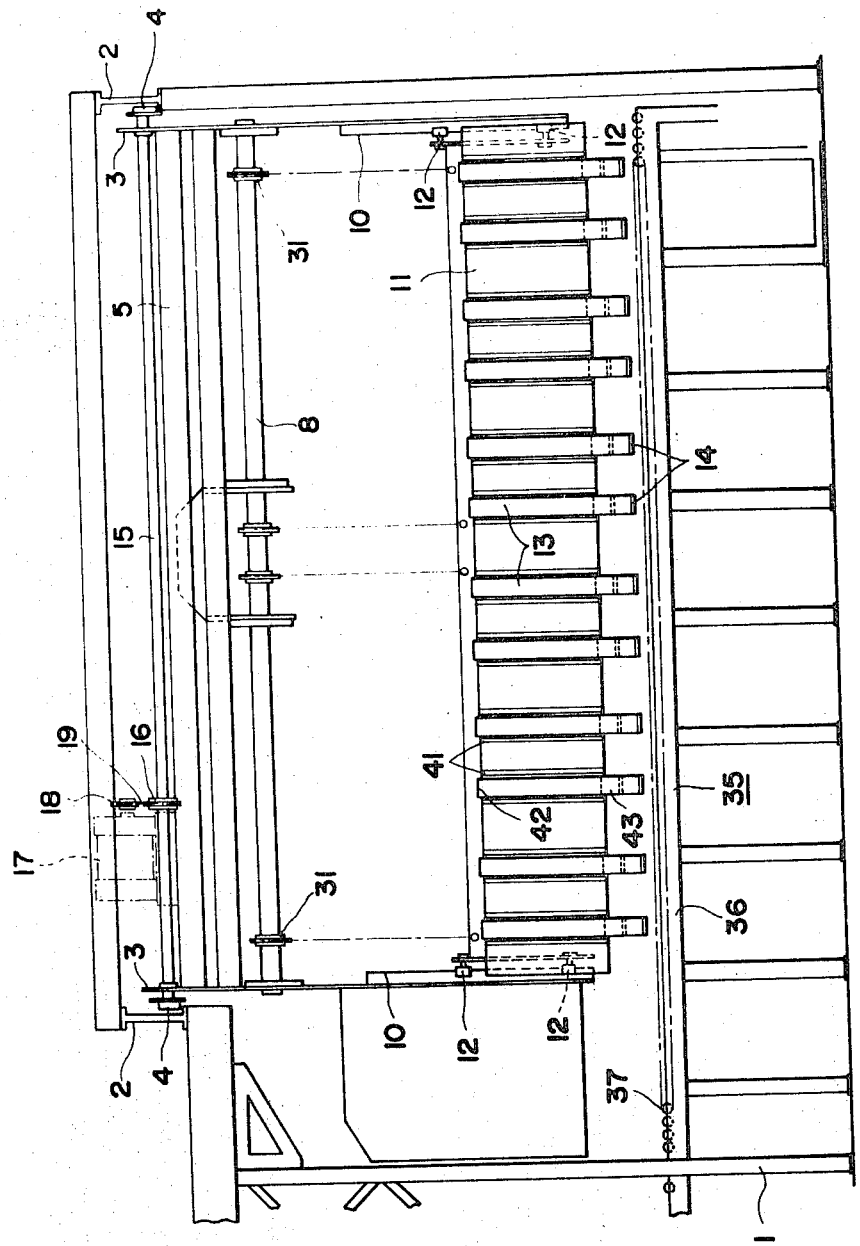

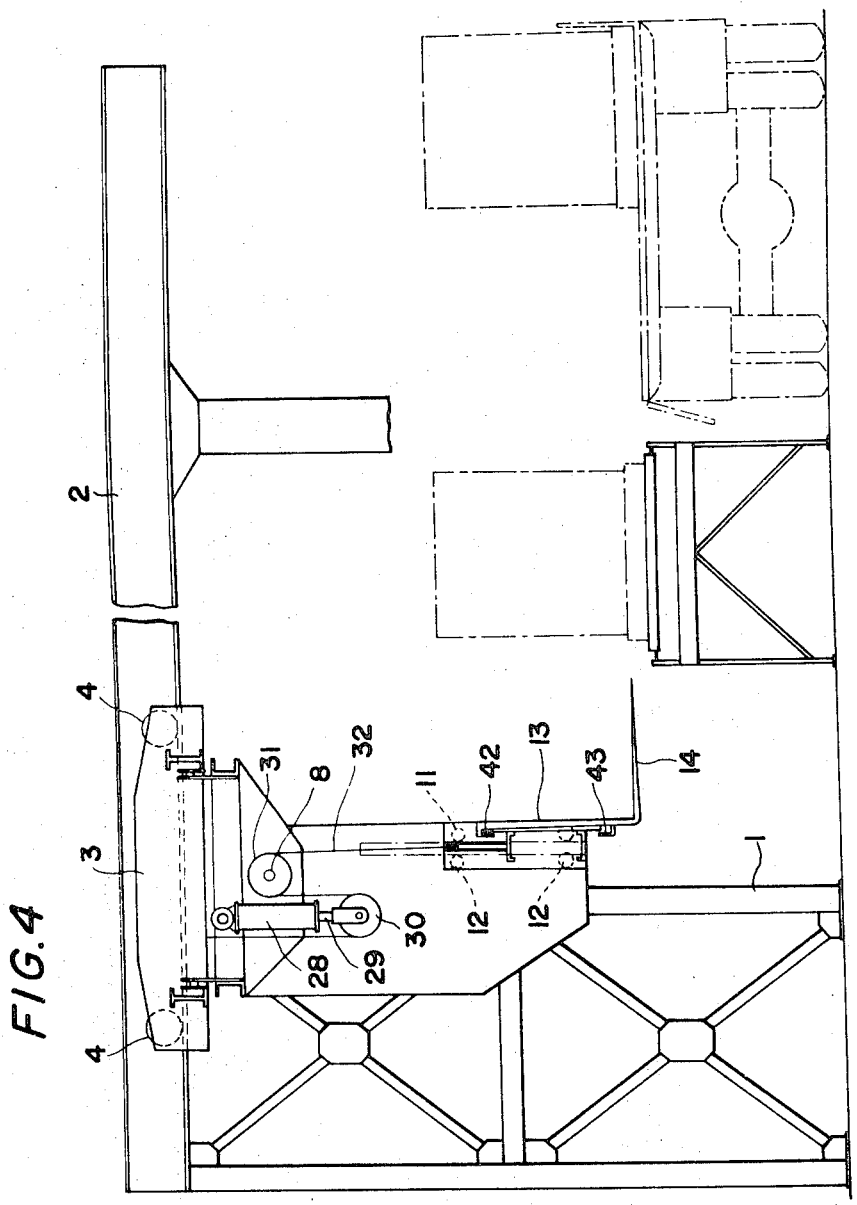

STACKING CRANE

RELATED APPLICATIONS

This is a continuation of U.S. Pat. application Ser. No. 133,621, filed Apr. 13, 1971 now abandoned.

This invention relates to forwarding apparatus. More particularly, the invention deals with a loading apparatus for loading a lorry or the like with merchandise which is shipped from a warehouse or products of a plant which are shipped directly from the plant.

It is customary, in shipping articles, to place the articles on a pallet and take such articles with the pallet on a lorry by means of a fork lift.

Nowadays, it is urgently required to shorten the time interval required for loading and shipping articles as the articles to be shipped are increasing in quantity. It is not possible to meet this demand by taking articles on a truck by placing them on a pallet and carrying only one pallet of articles at one time.

It often happens that a smooth flow of articles sent out from an automated warehouse or manufacturing plant is interrupted when they are taken on a lorry. The articles automatically moved downwardly from racks disposed in a number of layers in a tall warehouse are placed on the floor and wait for their turn to be conveyed to a lorry by a fork lift. Thus, a bottleneck of highly automated shipping operation lies in the step of loading a lorry with articles.

This invention obviates this problem. The invention has as its object the provision of a loading apparatus which permits to take on a lorry articles placed on a number of pallets at one time when such articles are conveyed by a conveyor and shipped from a warehouse or delivered from a manufacturing plant.

This invention makes it possible to smoothly take articles on a lorry and reduce the time interval required for effecting a loading operation after they are taken down from racks. Thus, the flow of articles is not interrupted and a loading operation can be performed satisfactorily.

The invention also makes it possible to facilitate a loading operation, improve working conditions and greatly save labor.

The invention also makes it possible to prevent damage to the articles when they are taken on a lorry, thereby preventing the deterioration and loss of articles.

Additional objects as well as features and advantages of this invention will become evident from the description set forth hereinafter when considered in conjunction with the accompanying drawings, in which:

FIG. 3 is a fragmentary front view of another embodiment of this invention; and

FIG. 4 is a side view of FIG. 3.

One embodiment of this invention will now be explained with reference to FIGS. 1 and 2. The apparatus comprises fixed frames 1, on which rails 2, 2 are disposed parallel to each other and longitudinally of the apparatus. Forwardly and rearwardly moving frames 3, 3 are supported by wheels 4, 4 mounted on shafts connected to the outer front and rear portions of the frames 3, 3 and adapted to move in rolling motion on the rails 2, 2 back and forth in FIG. 1. Rails 5, 5 are disposed on the frames 3, 3 parallel to each other and transversely of the apparatus in the front and rear portions thereof.

Figure 1:
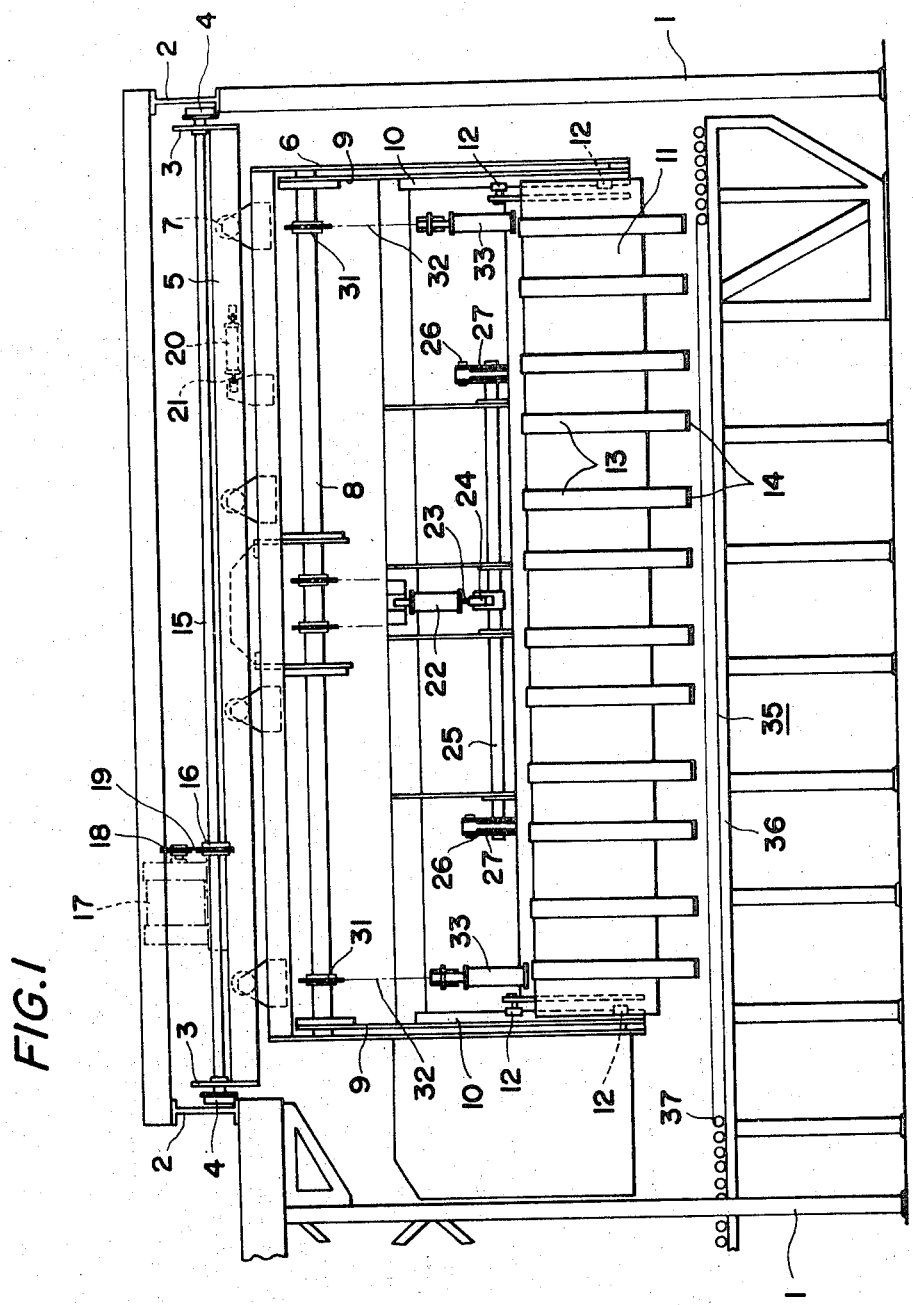
FIG. 1 is a front view of the loading apparatus of one embodiment of this invention.
Figure 2:
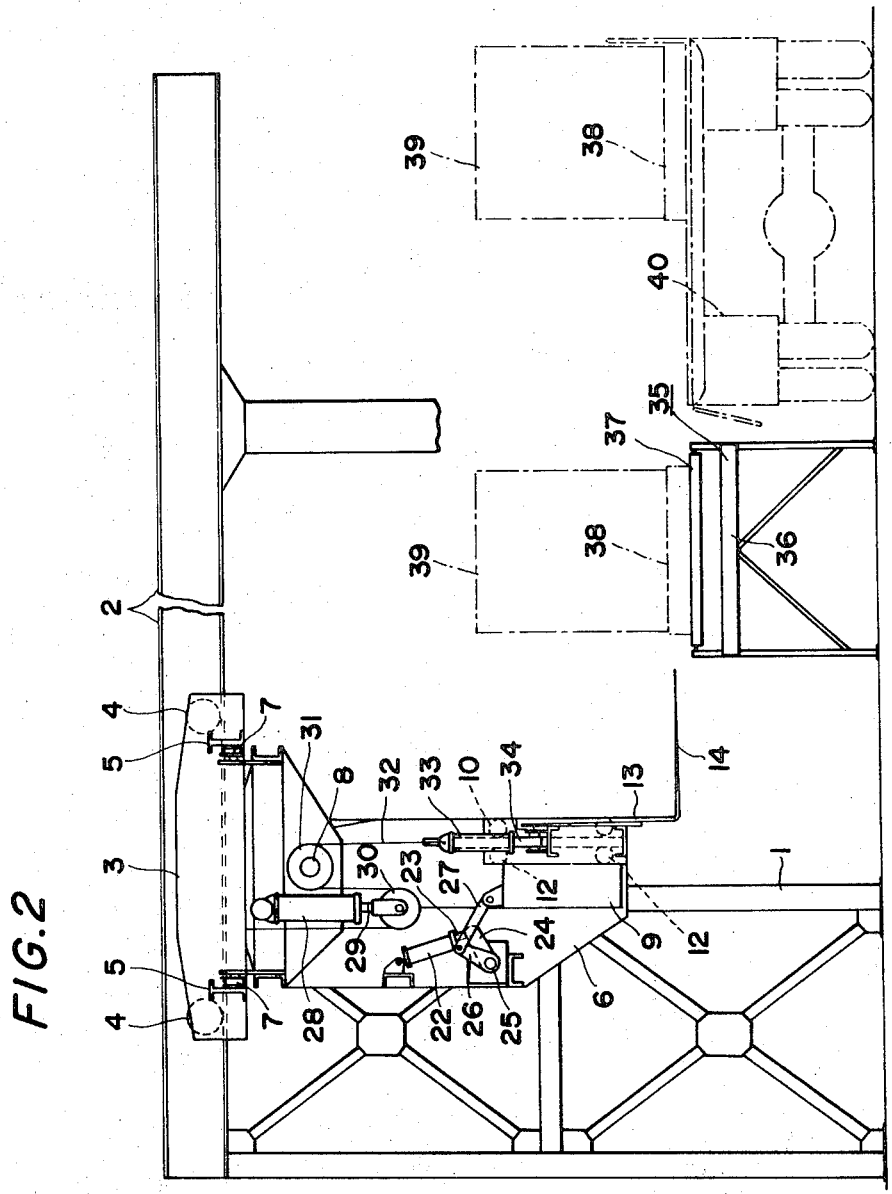
FIG. 2 is a side view of FIG. 1.

A rightwardly and leftwardly moving frame 6 is supported by a number of wheels 7, 7 mounted on shafts connected to the upper front and rear portions of the frame 6 and adapted to move in rolling motion on the rails 5, 5 to right and left in FIG. 1. A shaft 8 disposed transversely of the apparatus is mounted on the frame 6.

Pivotal frames 9, 9 are pivotally supported by the shaft 8 for pivotal movement forwardly and rearwardly in FIG. 1. Rails 10, 10 disposed vertically and parallel to each other are mounted on the inner sides of the pivotal frames 9, 9.

An upwardly and downwardly moving frame 11 is supported by wheels 12, 12 mounted on shafts connected to the upper and lower portions on opposite sides of the frame 11 and adapted to move upwardly and downwardly in rolling motion along the rails 10, 10. A number of forks 13, 13 are attached to the front surface of the frame 11 which forks have edge portions 14 extending outwardly from their lower ends in FIG. 1.

The forwardly and rearwardly moving frames 3, 3 are operated by a drive mechanism comprising a shaft 15 mounted between a pair of wheels 4, 4 disposed on opposite sides of the frame 3 and corresponding to each other, a sprocket wheel 16 mounted on the shaft 15, and a chain 19 trained about the sprocket 16 and a sprocket 18 mounted on a motor 17 provided on the frame 3.

The motor 17 is operated in normal and reverse directions for rotating the shaft 15 through the sprocket 18, chain 19 and sprocket 16 so as to drive the pair of wheels 4, 4 and move the frame 3 backwardly and forwardly by virtue of the engagement of the rails 4, 4 with the rails 2, 2.

The leftwardly and rightwardly moving frame 6 is operated by a drive mechanism comprising a hydraulic cylinder 20 mounted at its base on the forwardly and rearwardly moving frame 3, and a piston 21 received in the hydraulic cylinder 20 and having a forward end portion which is connected to the frame 6.

Upon actuation of the hydraulic cylinder 20, the piston 21 moves in reciprocating motion so as to move the leftwardly and rightwardly moving frame 6 by virtue of the engagement of the wheels 7, 7 with the rails 5, 5.

The pivotal frames 9, 9 are operated by a drive mechanism comprising a hydraulic cylinder 22 mounted at its base for pivotal motion in the intermediate portion of the leftwardly and rightwardly moving frame 6, a piston 23 received in the hydraulic cylinder 22 and connected at its forward end to one end portion of a connecting rod 24 which is secured at the other end portion to the intermediate portion of a shaft 25 mounted on the leftwardly and rightwardly moving frame 6, a plurality of connecting bars 26, 26 connected at one end thereof to opposite end portions of the shaft 25 and connected at the other end thereof to one end of a plurality of connecting bars 27, 27 which are connected at the other end thereof to the frame 9.

Upon actuation of the hydraulic cylinder 22, the piston 23 moves in reciprocating motion so as to rotate the shaft 25 through the connecting rod 24 and cause the bell-crank type connecting bars 26 and 27 to expand and contract, whereby the pivotal frames 9, 9 can move back and forth in pivotal motion about the shaft 8.

The upwardly and downwardly moving frame 11 is operated by a drive mechanism comprising hydraulic cylinders 28, 28 mounted at their base to opposite end portions of the leftwardly and rightwardly moving frame 6, sprocket wheels 30, 30 each mounted on the end portion of a piston 29 received in one of the hydraulic cylinders 28, 28, and chains 32, 32 secured at an upper end to the frame 3 and each trained about one of the sprockets 30, 30 and one of sprockets 31, 31 mounted on the shaft 8, such chains 32, 32 being secured at their lower end to the frame 11.

Upon actuation of the hydraulic cylinders 28, 28, the pistons 29, 29 move in reciprocating motion and the chains 32, 32 move back and forth through the sprocket wheels 30, 31, so that the upwardly and downwardly moving frame 11 can move up and down in reciprocating motion by virtue of the engagement of the wheels 12, 12 with the rails 10, 10.

Interposed between the upwardly and downwardly moving frame 11 and the chains 32, 32 are hydraulic cylinders 33, 33 which are connected at their base to the chains 32, 32 at their end. Each of the hydraulic cylinders 33, 33 receives therein a piston 34 which is connected at its forward end portion to the frame 11.

The oppositely disposed hydraulic cylinders 33, 33 are simultaneously actuated in opposite directions so as to move forwardly the piston 34 of the hydraulic cylinder 33 on one side and move rearwardly the piston 34 of the hydraulic cylinder 33 on the other side, so that the upwardly and downwardly moving frame 11 can be moved differentially in the opposite side portions.

A conveyor 35 is provided in the lower portion of the fixed frames 1, 1 and disposed transversely of the apparatus at right angles to the rails 2, 2 on the frames 1, 1. The conveyor 35 may comprise a number of drive rollers 37, 37 mounted on shafts and arranged in end to end relation in the upper portion of a frame of the conveyor 36. 38 designate pallets, 39 articles to be shipped, and 40 a lorry.

The operation of the apparatus constructed as aforementioned will now be explained. The pallets 38, 38 on which the articles 39 are placed are conveyed successively by the conveyor 35 and caused to stop between the rails 2, 2 on the opposite sides of the fixed frame 1.

The up and down movements of the upwardly and downwardly moving frame 11 are adjusted when a predetermined quantity of articles 39 are aligned between the rails 2 and 2 so that the edge portions 14, 14 of the forks 13, 13 may be disposed at substantially the same level as the pallets 38.

Then, the forwardly and backwardly moving frames 3, 3 are moved forwardly so that the edge portions 14, 14 of the forks 13, 13 may be inserted under the pallets 38, 38 disposed adjacent one another in side to side relation.

The upwardly and downwardly moving frame 11 is slightly moved upwardly so that a predetermined number of pallets 38, 38 may be simultaneously supported by the edge portions 14, 14 of the forks 13, 13.

The forwardly and rearwardly moving frames 3, 3 are moved forwardly to a position in which it is flush with the upper surface of the deck of the lorry 40. The frame 3 is stopped in this position.

The upwardly and downwardly moving frame 11 is moved downwardly so that the pallets 38, 38 may be moved downwardly to rest on the deck of the lorry 40.

The forwardly and backwardly moving frame 3 is moved rearwardly so as to withdraw the edge portions 14, 14 of the forks 13, 13 from under the pallets 38, 38. The frame 3 is stopped in its original position.

At this time, the leftwardly and rightwardly moving frame 6 is moved to left and right to adjust the position of the forks 13, 13 so that the forks 13, 13 may be indexed with the pallets 38, 38 or the deck of the lorry 40.

If the cargo on the deck of the lorry 40 is lopsided transversely and the deck is inclined to one side by the weight of the cargo, then the pivotal frames 9, 9 are moved in pivotal motion to adjust the angle of the forks 13, 13 so that the edge portions 14, 14 of the forks 13, 13 may be readily withdrawn from under the pallets 38, 38.

If the deck of the lorry 40 is inclined longitudinally thereof with an angle, then the oppositely disposed hydraulic cylinders 33, 33 are actuated in opposite directions to differentially move the upwardly and downwardly moving frame 11 in the vertical direction in its opposite side portions so that the frame 11 may be correctly indexed with the deck of the lorry 40.

In the embodiment described above, the forks 13, 13 may be made to move upwardly and downwardly so that their height may be adjusted. An embodiment comprising upwardly and downwardly moving forks will be explained with reference to FIGS. 3 and 4. The forks 13, 13 are each supported on opposite ends thereof by guide frames 41 for up and down motion which guide frames 41 are provided on the front surface of the upwardly and downwardly moving frame 11. Each fork 13 is provided in the upper and lower portions on its back with engaging members 42 and 43 for limiting the up and down movements of the fork with respect to the upwardly and downwardly moving frame 11.

If, as aforementioned, the cargo on the deck of the lorry 40 is lopsided transversely and the deck is inclined to one side by the weight of the cargo or if the deck of the lorry 40 is inclined longitudinally with an angle, then the forks 13, 13 move either upwardly or downwardly with respect to the upwardly and downwardly moving frame 11 simultaneously as the pallets 38, 38 are placed on the deck, so that the forks 13, 13 can automatically adjust their height in conformity with the state of the deck of the lorry 40.

It is to be understood that the invention is not limited to the specific forms of the mechanisms for operating the frames, and that any other suitable frame operating mechanisms may be used within the scope of the invention.

What is claimed is:

1. A stacking crane to be used in a loading dock area comprising
   a fixed frame 2,
   a forwardly and backwardly moving frame 3 mounted on said fixed frame 2 for forward and backward movements in reciprocating motion,
   a leftwardly and rightwardly moving frame 6 mounted on said forwardly and backwardly moving frame 3 for leftward and rightward movements in reciprocating motion, a pivoted frame 9 mounted on said leftwardly and rightwardly moving frame 6 for pivotal motion in an upwardly and downwardly direction, an upwardly and downwardly moving frame 11 mounted on said pivoted frame 9 for upward and downward movements in reciprocating motion, a plurality of forks 13 provided on said upwardly and downwardly moving frame 11 for operation as said frames are actuated, differentially moving means 33 for moving differentially said upwardly and downwardly moving frame 11 in upward and downward directions and mounted at the left and right ends thereof, means 28 to allow said forks 13 to be movable upwardly and downwardly with respect to said pivoted frame 9, means 22 to allow said pivoted frame 9 to be movable pivotally, and a conveyer 35 located adjacent said forks 13 to receive materials loaded on said plurality of forks 13 as to facilitate loading and unloading of materials in a loading dock area.

2. The stacking crane of claim 1 wherein said forks 13 are each supported on opposite sides thereof by guide frames 41 for up and down motions, said guide frames 41 being provided on the front surface of said moving frame 11, and engaging members 42 and 43 for limiting the up and down movements of the forks 13 with respect to the upwardly and downwardly moving frame 11 are provided in the upper and lower portions of each of said forks 13.

* * * * *